(12) United States Patent
Sasaki et al.

(10) Patent No.: US 12,291,086 B2
(45) Date of Patent: May 6, 2025

(54) WEATHER STRIP AND METHOD OF MANUFACTURING THE SAME

(71) Applicants: NISHIKAWA RUBBER CO., LTD., Hiroshima (JP); AISIN CORPORATION, Aichi (JP)

(72) Inventors: Yoichiro Sasaki, Hiroshima (JP); Daisuke Hayashi, Hiroshima (JP); Yasutaka Shinoda, Kariya (JP); Motonari Inagaki, Kariya (JP)

(73) Assignees: NISHIKAWA RUBBER CO., LTD., Hiroshima (JP); AISIN CORPORATION, Aichi (JP)

( * ) Notice: Subject to any disclaimer, the term of this patent is extended or adjusted under 35 U.S.C. 154(b) by 159 days.

(21) Appl. No.: 17/992,982

(22) Filed: Nov. 23, 2022

(65) Prior Publication Data

US 2023/0166589 A1 Jun. 1, 2023

(30) Foreign Application Priority Data

Nov. 27, 2021 (JP) .................................. 2021-192609

(51) Int. Cl.
| | |
|---|---|
| *B60J 10/86* | (2016.01) |
| *B60J 10/18* | (2016.01) |
| *B60J 10/24* | (2016.01) |
| *B60J 10/32* | (2016.01) |

(52) U.S. Cl.
CPC .............. *B60J 10/86* (2016.02); *B60J 10/18* (2016.02); *B60J 10/24* (2016.02); *B60J 10/32* (2016.02)

(58) Field of Classification Search
CPC ....................................................... B60J 10/22
See application file for complete search history.

(56) References Cited

U.S. PATENT DOCUMENTS

| | | | | |
|---|---|---|---|---|
| 4,067,146 A | * | 1/1978 | Mesnel | B60J 10/24 |
| | | | | 49/495.1 |
| 4,979,333 A | * | 12/1990 | Goto | B60J 10/24 |
| | | | | 49/479.1 |
| 5,261,206 A | * | 11/1993 | Mesnel | B60J 10/22 |
| | | | | 49/374 |

(Continued)

FOREIGN PATENT DOCUMENTS

| | | | | |
|---|---|---|---|---|
| DE | 102008027619 A1 | * | 12/2009 | ............. B60J 10/22 |
| FR | 2962073 A1 | * | 1/2012 | ............. B60J 10/18 |

(Continued)

*Primary Examiner* — Catherine A Kelly
(74) *Attorney, Agent, or Firm* — Holtz, Holtz & Volek PC (57) ABSTRACT

A weather strip couples to a flange with curved parts of a sliding door of an automobile. The weather strip includes an installation base member, a hollow part, and an insert. The installation base member couples to the flange and includes an inner-cabin side wall, a first outer-cabin side wall, and a connecting wall. A part of the installation base member which couples to the curved parts is cut out, to provide a cut-out portion. The cut-out portion is subjected to die molding, to provide a die-molded part. The hollow part is integrally formed with the installation base member by extrusion molding. The insert is shaped in conformance with the curved parts and is embedded in the die-molded part with a plurality of concave shaped parts of the insert abutted with a plurality of pins of a die under the die molding.

11 Claims, 11 Drawing Sheets

(56) References Cited

U.S. PATENT DOCUMENTS

| | | | | |
|---|---|---|---|---|
| 5,492,387 A | * | 2/1996 | Yada | B29D 99/0053 |
| | | | | 52/204.597 |
| 5,538,578 A | * | 7/1996 | Sugawara | B29C 66/1142 |
| | | | | 264/261 |
| 5,618,608 A | * | 4/1997 | Teishi | B60J 10/80 |
| | | | | 49/490.1 |
| 6,158,172 A | | 12/2000 | Yamane et al. | |
| 6,571,514 B1 | * | 6/2003 | Aritake | B60J 10/21 |
| | | | | 49/490.1 |
| 6,874,281 B2 | * | 4/2005 | Fujita | B60J 10/32 |
| | | | | 296/76 |
| 6,935,072 B2 | * | 8/2005 | Kogiso | B60J 10/30 |
| | | | | 49/490.1 |
| 7,135,216 B2 | * | 11/2006 | Tsujiguchi | B60J 10/18 |
| | | | | 49/490.1 |
| 9,114,691 B2 | * | 8/2015 | Kawaguchi | B29C 45/16 |
| 9,415,671 B2 | * | 8/2016 | Sentani | B60J 10/235 |
| 9,422,760 B2 | * | 8/2016 | Matsuda | B60J 10/24 |
| 10,513,169 B2 | * | 12/2019 | Ogawa | B60J 10/16 |
| 11,148,513 B2 | * | 10/2021 | Matsuura | B60J 10/86 |
| 11,572,729 B2 | * | 2/2023 | Matsumoto | E05F 15/44 |
| 2017/0072777 A1 | * | 3/2017 | Kawaguchi | B60J 10/22 |
| 2017/0225555 A1 | * | 8/2017 | Takeda | E06B 3/36 |
| 2017/0328112 A1 | * | 11/2017 | Okada | E05F 15/42 |

FOREIGN PATENT DOCUMENTS

| | | | | | |
|---|---|---|---|---|---|
| FR | 3105108 A1 | * | 6/2021 | | B60J 10/18 |
| GB | 2237768 A | * | 5/1991 | | B29C 33/44 |
| JP | H05000517 U | | 1/1993 | | |
| JP | H06099742 A | | 4/1994 | | |
| JP | 107030121 U | | 6/1995 | | |
| JP | H07031440 U | | 6/1995 | | |
| JP | H11078540 A | | 3/1999 | | |
| JP | 2005001640 A | * | 1/2005 | | B60J 10/24 |
| JP | 2005075085 A | | 3/2005 | | |
| JP | 2007190981 A | | 8/2007 | | |
| JP | 2011073556 A | | 4/2011 | | |
| JP | 2016004702 A | | 1/2016 | | |
| JP | 2017052488 A | | 3/2017 | | |
| JP | 2017136978 A | | 8/2017 | | |
| JP | 2017203661 A | | 11/2017 | | |
| JP | 2020059417 A | * | 4/2020 | | B60J 10/18 |
| KR | 970003166 Y1 | * | 4/1997 | | |
| SE | 415083 B | * | 9/1980 | | |

* cited by examiner

WEATHER STRIP AND METHOD OF MANUFACTURING THE SAME

REFERENCE TO RELATED APPLICATIONS

This application claims the benefit under 35 USC § 119 of JP Patent Application JP 2021-192609 filed Nov. 27, 2021, the entire disclosure of which is incorporated herein by reference.

BACKGROUND OF THE INVENTION

The present invention relates to a weather strip and a method of manufacturing the same. The weather strip couples to a flange with curved parts of at least one of a peripheral edge of a panel which moves between at least two positions to open and close a door opening of an automobile body of an automobile or a peripheral edge of the opening. The panel includes a sliding door of a wagon or a station wagon.

Figure 10:
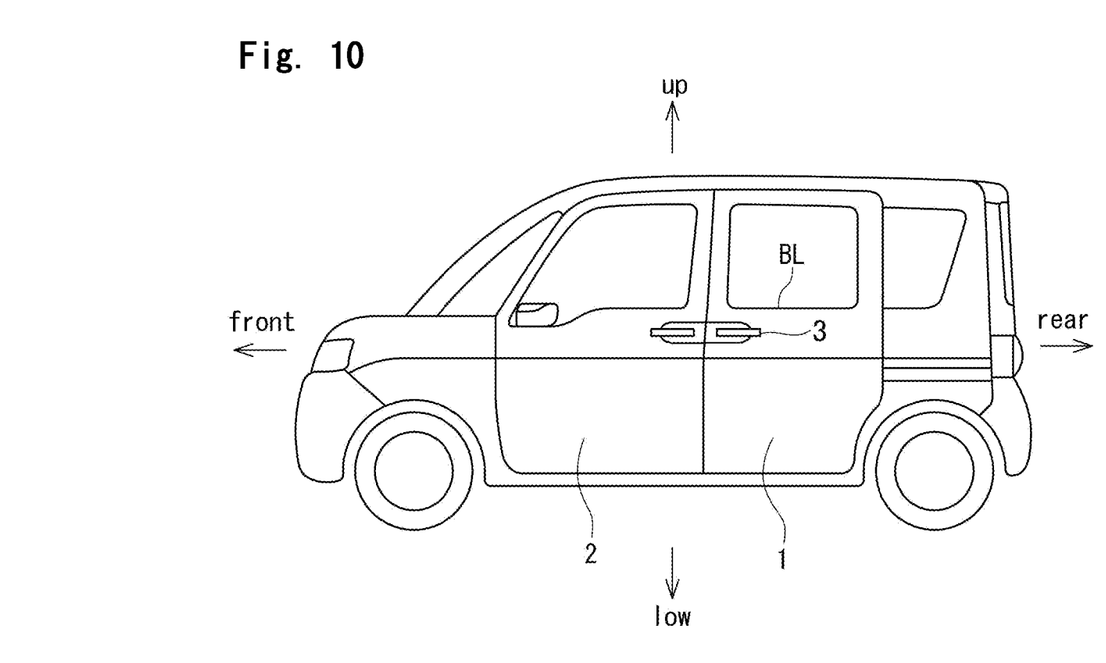
FIG. 10 is a side view of an automobile with the sliding door that opens and closes a door opening of an automobile body of an automobile.
Figure 11:
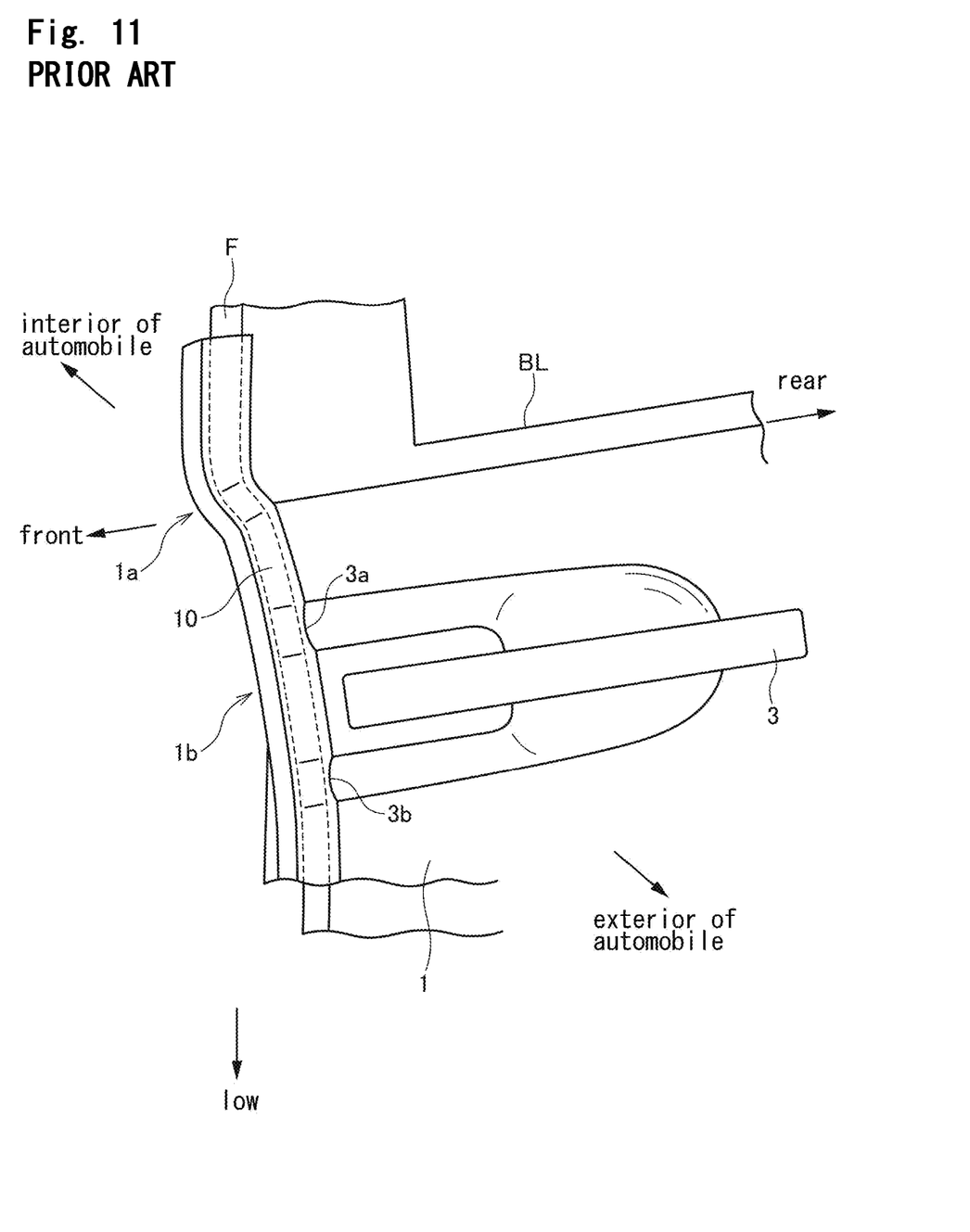
FIG. 11 is an enlarged perspective view of a conventional weather strip coupling to the sliding door illustrated in FIG. 10.

As illustrated in FIG. 11, a weather strip 10 couples to a flange F of a sliding door 1 or a back door, for example, of a wagon illustrated in FIG. 10. The flange F protrudes toward a front part of the automobile body from a front edge of the sliding door 1. The sliding door 1 moves between at least two positions to open and close the opening. The weather strip 10 includes an installation base member and a hollow part. The hollow part includes a sensor. When an object including part of a human body, e.g. fingers, hands, or legs is disposed between the sliding door 1 and a rear end of a front door 2, and makes contact with the hollow part, an electric signal provides the indication that the object is in the opening.

The flange F, to which the weather strip 10 couples, has a substantially S shape on a belt line BL in conformance with a shape of the sliding door 1. More specifically, the flange F has a curved part 1a and a curved part 1b. The curved part 1a extends between the belt line BL and an upper part of the flange F and has a convex shape that extends toward an interior of the automobile. The curved part 1b extends between the belt line BL and a lower part of the flange F and has a convex shape that extends toward an exterior of the automobile.

The weather strip 10, formed by extrusion molding, is hard to couple alongside of the curved parts 1a, 1b. The sensor of weather strip 10, which fails to extend in conformance with the shape of the sliding door 1, can fail to detect the objects precisely.

In this connection, Japanese Unexamined Patent Application Publication Nos. 2017-203661 and 2005-075085 are directed to the weather strip 10. The weather strip 10 has part that couples to the curved parts 1a, 1b cut out and subjected to die molding, to improve followability.

Japanese Unexamined Utility Model Application Publication No. 05-000517 is directed to the weather strip for use on a corner part of an outer peripheral part of an automobile door. The weather strip is subjected to die molding with an insert embedded. This leads to an idea of embedding the insert in the part of the weather strip that couples to the curved parts 1a, 1b.

The weather strip of Japanese Unexamined Patent Application Publication No. 2017-203661 includes a curvature holding portion, which is prepared by cutting out the curved part and subjecting the cut-out part to die molding. The curvature holding portion is increased in strength compared with part formed by extrusion molding but may have an insufficient strength.

The weather strip of Japanese Unexamined Patent Application Publication No. 2005-075085, formed by extrusion molding, has a core metal embedded in an installation member. A curved part of the installation member (outer-cabin side wall) is cut out and subjected to die molding, to prepare a curvature holding portion. The curvature holding portion, however, can be decreased in strength compared with the part formed by extrusion molding.

The insert may be embedded in the curved part of the weather strip in line with Japanese Unexamined Utility Model Application Publication No. 05-000517, to increase strength. Pressure from injection of die-molding material into a cavity of a die for forming a die-molded part can misalign the insert once arranged on a predetermined position in the cavity. The insert embedded in the curved part increases the strength, but the misalignment can spoil appearance of the weather strip and affect precise detection of the objects.

To solve the above problems, it is an object of the present invention to provide a weather strip that has an unspoiled appearance and couples alongside of the curved parts, and a method of manufacturing the same.

SUMMARY OF THE INVENTION

To achieve the above object, an aspect of the present invention provides a weather strip (30). The weather strip (30) couples to a flange (F) of at least one of a peripheral edge of a panel (1) of an automobile or a peripheral edge of a door opening of an automobile body of the automobile. The flange (F) has curved parts (1a, 1b). The panel (1) moves between at least two positions to open and close the opening. The weather strip (30) includes an installation base member (21), a hollow part (22), and an insert (50).

The installation base member (21) couples to the flange (F). The installation base member (21) includes an inner-cabin side wall (21a), a first outer-cabin side wall (21b), and a connecting wall (21c) which connects the side walls (21a, 21b). Part (21b) of the installation base member (21) is cut out, to provide a cut-out portion (K). The part (21b) couples to the curved parts (1a, 1b). The cut-out portion (K) is subjected to die molding using die-molding material, to provide a die-molded part (M).

The hollow part (22) is integrally formed with the installation base member (21) by extrusion molding.

The insert (50) is shaped in conformance with the curved parts (1a, 1b). The insert (50) has a plurality of concave shaped parts (53, 54). The insert (50) is embedded in the die-molded part (M). The plurality of concave shaped parts (53, 54) abut with a plurality of pins (103a, 104a) of a die (103, 104) under the die molding.

In addition, according to an aspect of the present invention, the plurality of concave shaped parts (53, 54), which abut with the plurality of pins (103a, 104a), are exposed from the die-molding material.

In addition, according to an aspect of the present invention, the insert (50) has flat edges (51, 52), to provide flat-shaped parts. The flat-shaped parts are inserted into part of the installation base member (21), which is formed by extrusion molding and uncut, from the cut-out portion (K), to arrange the flat-shaped parts on an outer-cabin side surface of the first outer-cabin side wall (21b).

In addition, according to an aspect of the present invention, the weather strip (30) further includes a first hollow seal part (26) on an outer-cabin side of the installation base member (21), formed by extrusion molding. The first hollow seal part (26) and the first outer-cabin side wall (21b) of the installation base member (21) are cut out, to provide the cut-out portion (K). The cut-out portion (K) is subjected to die molding, to provide a second hollow seal part (26M) formed by die molding and a second outer-cabin side wall (21bM) formed by die molding with the insert (50) arranged and embedded in the second outer-cabin side wall (21bM) formed by die molding. The second hollow seal part (26M) formed by die molding corresponds to the first hollow seal part (26) and the second outer-cabin side wall (21bM) formed by die molding corresponds to the first outer-cabin side wall (21b) of the installation base member (21).

In addition, according to an aspect of the present invention, the second hollow seal part (26M) formed by die molding includes an inclined wall (26M1) formed by die molding and a second installation wall (26M2) formed by die molding. The inclined wall (26M1) formed by die molding inclines and extends toward an exterior of the automobile from part of the second outer-cabin side wall (21bM) formed by die molding closer to the hollow part (22). The second installation wall (26M2) formed by die molding connects with an end part of the inclined wall (26M1) formed by die molding and extends toward an end part of the second outer-cabin side wall (21bM) formed by die molding. The inclined wall (26M1) formed by die molding is curved in conformance with a member which is opposite the inclined wall (26M1) formed by die molding.

In addition, according to an aspect of the present invention, the second outer-cabin side wall (21bM) formed by die molding includes an inclined wall (26M1) formed by die molding and a second installation wall (26M2) formed by die molding. The inclined wall (26M1) formed by die molding inclines and extends toward an exterior of the automobile from part of the second outer-cabin side wall (21bM) formed by die molding closer to the hollow part (22). The second installation wall (26M2) formed by die molding connects with an end part of the inclined wall (26M1) formed by die molding and extends toward an end part of the second outer-cabin side wall (21bM) formed by die molding. The second installation wall (26M2) formed by die molding has a hole (CH) for a clip.

In addition, according to an aspect of the present invention, the weather strip (30) further includes a sensor (S) fixed in the hollow part (22), and
when an object is disposed between the panel (1) and the opening, and makes contact with the hollow part (22) when the panel (1) is moved towards a closed position, an electric signal provides an indication that the object is in the opening.

It is to be noted that the "electric signal" includes a change by short between the two core wires, and a change in capacitance.

In addition, an aspect of the present invention provides a method of manufacturing a weather strip (30). The weather strip (30) couples to a flange (F) of at least one of a peripheral edge of a panel (1) of an automobile or a peripheral edge of a door opening of an automobile body of the automobile. The flange (F) has curved parts (1a, 1b). The panel (1) moves between at least two positions to open and close the opening. The weather strip (30) includes an installation base member (21), a hollow part (22), and an insert (50).

The installation base member (21) couples to the flange (F). The installation base member (21) includes an inner-cabin side wall (21a), a first outer-cabin side wall (21b), and a connecting wall (21c) which connects the side walls (21a, 21b). Part (21b) of the installation base member (21) is cut out, to provide a cut-out portion (K). The part (21b) couples to the curved parts (1a, 1b). The cut-out portion (K) is subjected to die molding using die-molding material, to provide a die-molded part (M).

The hollow part (22) is integrally formed with the installation base member (21) by extrusion molding.

The insert (50) is shaped in conformance with the curved parts (1a, 1b). The insert (50) has a plurality of concave shaped parts (53, 54).

The method includes:
placing the weather strip (30), which has the cut-out portion (K), between an upper die (101) and a lower die (102);
providing inner dies (103, 104) between the upper die (101) and the lower die (102), the inner dies (103, 104) having a plurality of pins (103a, 104a) which protrude;
arranging and fixing the insert (50) in the cut-out portion (K) with the plurality of concave shaped parts (53, 54) abutted with the plurality of pins (103a, 104a) of the inner dies (103, 104), the cut-out portion (K) being where the insert (50) is embedded by die molding;
pouring the die-molding material into the cut-out portion (K); and
subjecting the cut-out portion (K) to die molding.

Symbols in parentheses show constituents or items corresponding to the drawings.

According to the present invention, the weather strip includes the installation base member and the hollow part, which are formed by extrusion molding. The installation base member couples to the flange with the curved parts of at least one of the peripheral edge of the panel which moves between at least two positions to open and close the opening or the peripheral edge of the opening. The part of the installation base member, which couples to the curved parts, is cut out, to provide the cut-out portion. The cut-out portion is subjected to die molding using the die-molding material, to provide the die-molded part with the insert shape in conformance with the curved parts embedded in the die-molded part. The insert allows the die-molded part to have sufficient strength compared with a die-molded part without the insert formed by merely subjecting the cut-out portion to die molding.

In addition, the insert has the plurality of concave shaped parts which abut with the plurality of pins of the die under the die molding, to increase fixing force of the insert and to prevent misalignment of the insert due to pressure from injection of the die-molding material.

This configuration keeps appearance of the weather strip unspoiled.

This configuration is particularly effective to the weather strip that includes the sensor in the hollow part, wherein when the object is disposed between the panel including a door and the opening, and makes contact with the hollow part when the panel is moved towards the closed position, the electric signal provides the indication that the object is in the opening. This is because this configuration prevents deterioration in sensor function due to the misalignment of the insert.

In addition, the plurality of concave shaped parts, which abut with the plurality of pins, are exposed from the die-molding material. This configuration further increases the fixing force of the insert inside the cavity of the die.

In addition, the insert has the flat edges, to provide the flat-shaped parts. The flat-shaped parts are inserted into the part of the installation base member, which is formed by extrusion molding and uncut, from the cut-out portion, to arrange the flat-shaped parts on the outer-cabin side surface of the first outer-cabin side wall. This configuration keeps the edges of the insert between the first outer-cabin side wall and the inner die of the die, to increase the fixing force of the insert further.

In addition, the weather strip further includes the first hollow seal part on the outer-cabin side of the installation base member, formed by extrusion molding. The first hollow seal part and the first outer-cabin side wall of the installation base member are cut out, to provide the cut-out portion. The cut-out portion is subjected to die molding, to provide the second hollow seal part formed by die molding and the second outer-cabin side wall formed by die molding with the insert arranged and embedded in the second outer-cabin side wall formed by die molding. The second hollow seal part formed by die molding corresponds to the first hollow seal part and the second outer-cabin side wall formed by die molding corresponds to the first outer-cabin side wall of the installation base member. The second hollow seal part formed by die molding covers an exposed part of the insert from an exterior, to keep appearance of the weather strip unspoiled.

In addition, the second hollow seal part formed by die molding includes the second installation wall formed by die molding which connects with the end part of the inclined wall formed by die molding and extends toward the end part of the second outer-cabin side wall formed by die molding. The inclined wall formed by die molding inclines and extends toward the exterior of the automobile from the part of the second outer-cabin side wall formed by die molding closer to the hollow part. The inclined wall formed by die molding is curved in conformance with the member which is opposite the inclined wall formed by die molding. This configuration keeps appearance of the weather strip unspoiled.

In addition, the second hollow seal part formed by die molding includes the inclined wall formed by die molding and the second installation wall formed by die molding. The inclined wall formed by die molding inclines and extends toward the exterior of the automobile from the part of the second outer-cabin side wall formed by die molding closer to the hollow part. The second installation wall formed by die molding connects with the end part of the inclined wall formed by die molding, extends toward the end part of the second outer-cabin side wall formed by die molding, and has the hole for the clip. This configuration fixes the weather strip firmly on the panel or the opening using the clips, not double-sided tape, provided at regular intervals.

In addition, the method includes:
placing the weather strip, which is formed by extrusion molding and has the cut-out portion, between the upper die and the lower die;
arranging and fixing the insert, which is shaped in conformance with the curved parts and has the plurality of concave shaped parts, in the cut-out [part] portion with the plurality of concave shaped parts abutted with the plurality of pins of the inner dies, the cut-out portion being where the insert is embedded by die molding;
pouring the die-molding material into the cut-out portion; and
subjecting the cut-out portion to die molding.

This configuration increases fixing force of the insert, to prevent misalignment of the insert due to the pressure from injection of the die-molding material.

The insert embedded in the die-molded part enables the weather strip to couple to the curved parts of the flange stably.

DETAILED DESCRIPTION

Referring to the Drawings, a weather strip 30 according to an embodiment of the present invention will be described.

The weather strip 30 couples to a flange F of a sliding door 1 of an automobile. The flange F protrudes toward a front part of an automobile body of the automobile from a front edge of the sliding door 1 illustrated in FIG. 1. The sliding door 1 moves between at least two positions to open and close a door opening of the automobile body illustrated in FIG. 10. A sensor (pressure sensitive sensor) S is fixed in the weather strip 30 and detects an electric signal which provides an indication that the object is in the opening. The object includes part of a human body, e.g. fingers, hands, or legs between the sliding door 1 (may also be front door 2 or side door) and the opening. The flange F has a substantially S shape on a belt line BL in conformance with a shape of the sliding door 1. More specifically, the flange F has a curved part 1a and a curved part 1b. The curved part 1a extends between the belt line BL and an upper part of the flange F and has a convex shape that extends toward an interior of the automobile. The curved part 1b extends between the belt line BL and a lower part of the flange F and has a convex shape that extends toward an exterior of the automobile. When constituents or items correspond to those in prior arts, the same symbols are used. The "electric signal" includes a change by short between two core wires 31, 32, and a change in capacitance.

Figure 2:
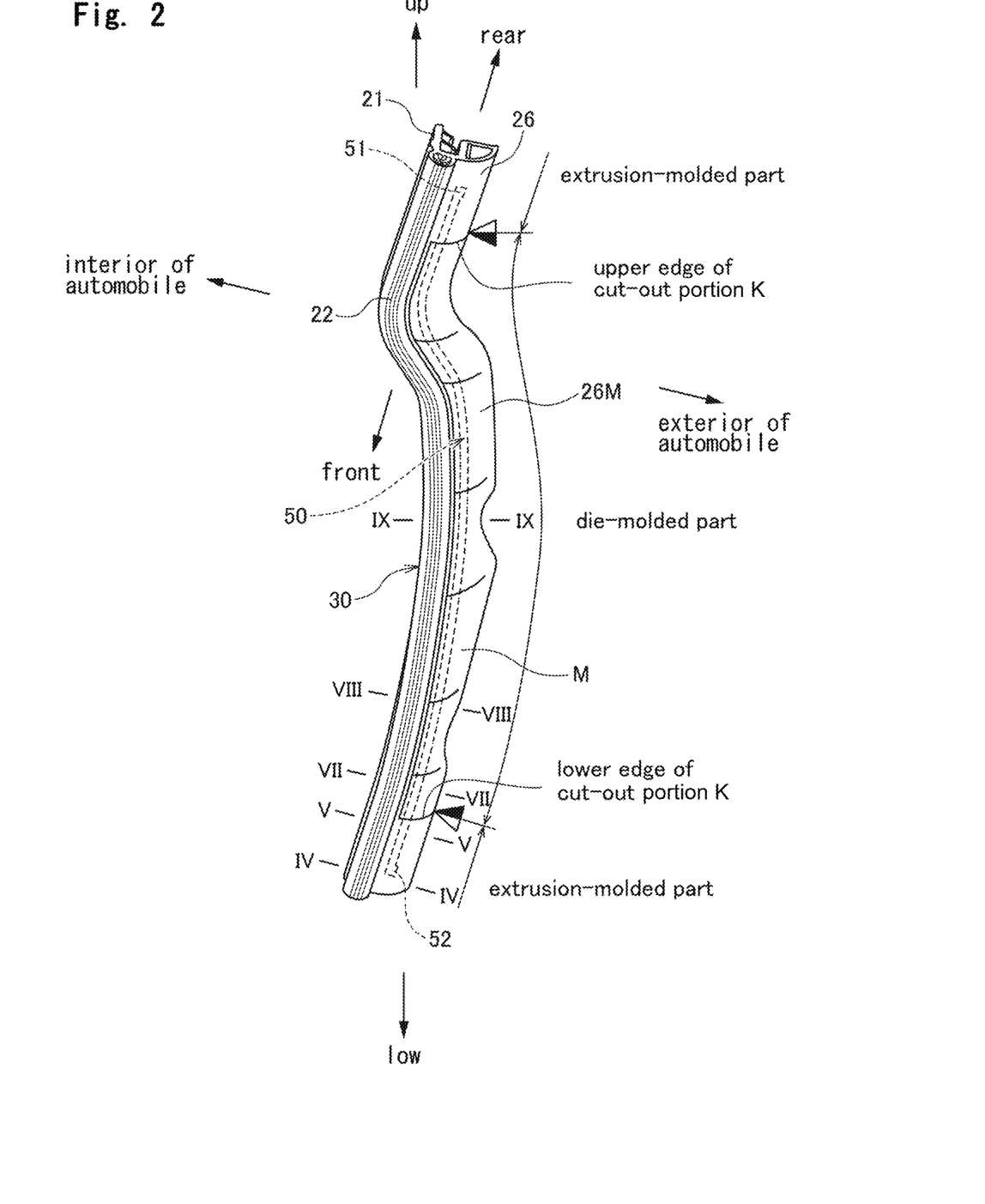
FIG. 2 is an enlarged perspective view of the principal components of the weather strip illustrated in FIG. 1.
Figure 4:
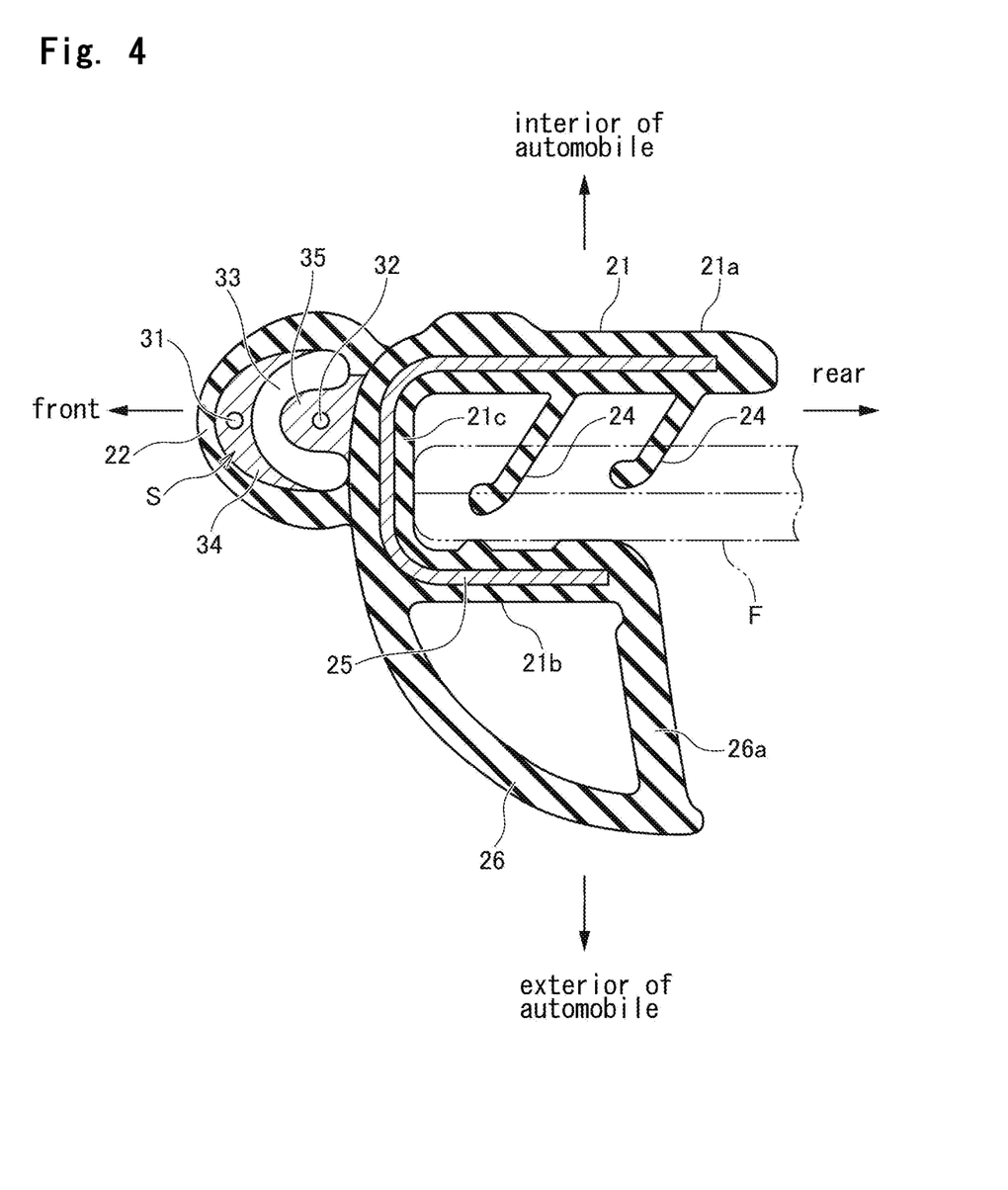
FIG. 4 is an enlarged cross-sectional view taken along line IV-IV in FIG. 2.

As illustrated in FIGS. 2 and 4, the weather strip 30 includes an installation base member 21, a hollow part 22, and the sensor S. The installation base member 21 directly couples to the flange F. The installation base member 21 includes an inner-cabin side wall 21a, a first outer-cabin side wall 21b, and a connecting wall 21c which connects the side walls 21a, 21b. The hollow part 22 is integrally formed with the installation base member 21 by extrusion molding. The hollow part 22 makes contact with the object when the object including the finger is disposed between a front end surface of the sliding door 1 and the opening. The front end surface is opposite the opening. The sensor S is fixed in the hollow part 22 and detects the electric signal which provides the indication that the object is in the opening. The hollow part 22 has two core wires, or electrode wires including stranded wires, 31, 32, rubber like elastic bodies 34, 35, and a space 33. The core wires 31, 32 extend in an upper-lower direction, or a direction parallel to the peripheral edge of the opening, and are embedded in the rubber like elastic bodies 34, 35. The rubber like elastic bodies 34, 35 have conductivity. The space 33 is positioned between the rubber like elastic bodies 34, 35. The installation base member 21 has a plurality of holding lips 24, 24 formed inside and a core 25 embedded. The core 25 has a substantially U-shaped cross section and increases rigidity of the installation base member 21. A first hollow (or lip-shaped) seal part 26 is provided on the first outer-cabin side wall 21b.

As illustrated in FIG. 2, part of the installation base member 21 is cut out, to provide a cut-out portion K. The part couples to the curved parts 1a, 1b. In this embodiment, the first outer-cabin side wall 21b and the first hollow seal part 26 are cut out. The cut-out portion K is subjected to die molding using die-molding material, to provide a die-molded part M. In FIGS. 2, 7, 8, and 9, a black side part of black-white triangles indicates a die-molded part and a white side part indicates an extrusion-molded part. An insert 50 is shaped in conformance with the curved parts 1a, 1b as illustrated in FIG. 3, and embedded in die-molded part M.

The insert 50 has a plurality of concave shaped parts 53, 54. The concave shaped parts 53 abut with first pins 103a of a first inner die 103, and the concave shaped parts 54 abut with second pins 104a of a second inner die 104 under the die molding to be discussed below.

Figure 3A:
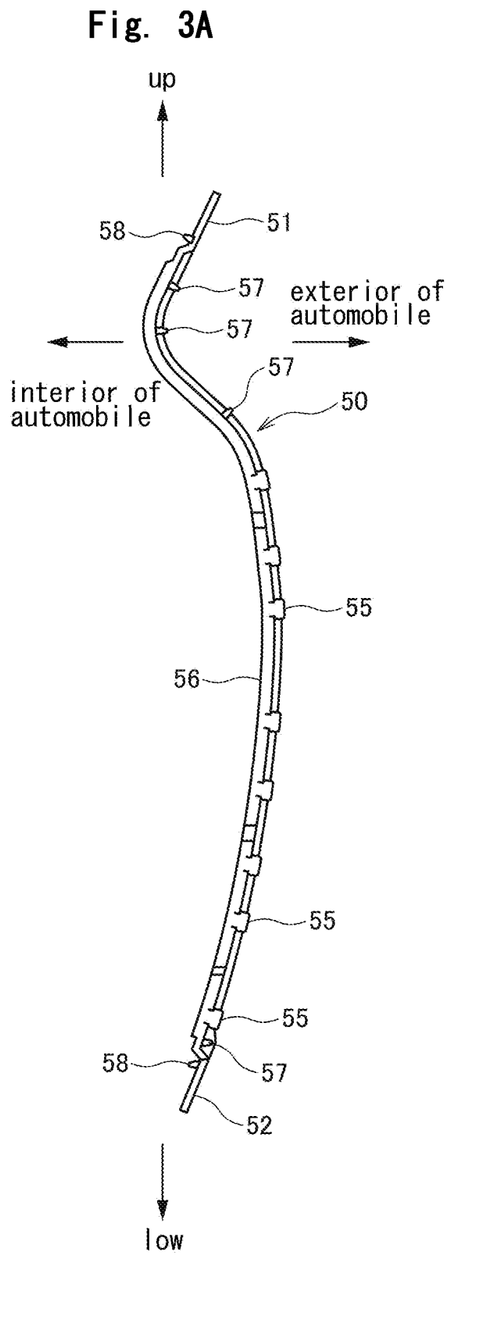
FIG. 3A is a side view of an insert embedded in the weather strip illustrated in FIG. 2.
Figure 3B:
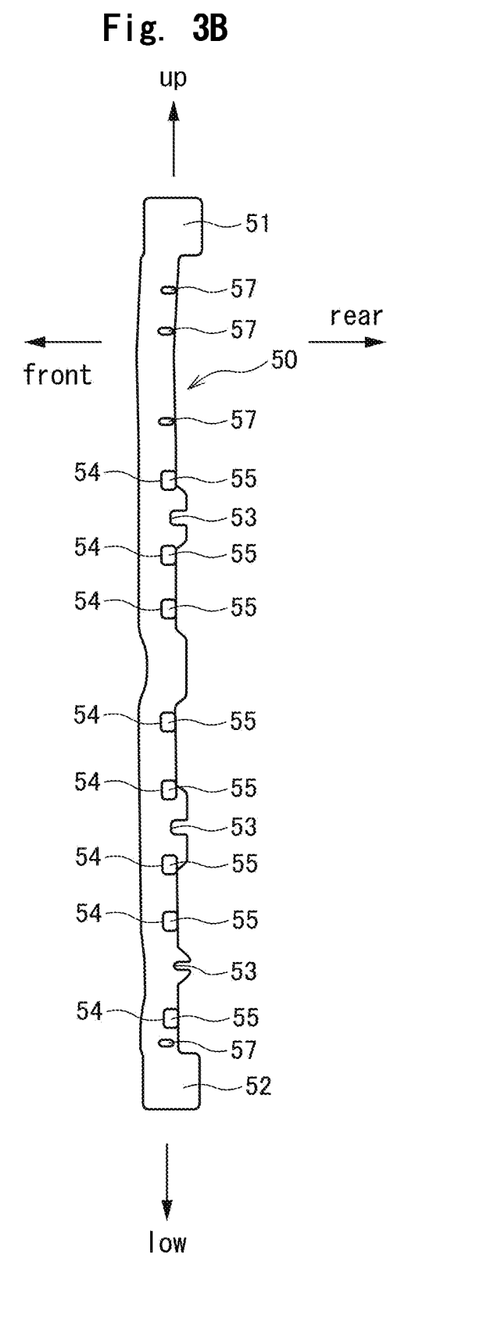
FIG. 3B is a front view of the insert.
Figure 7:
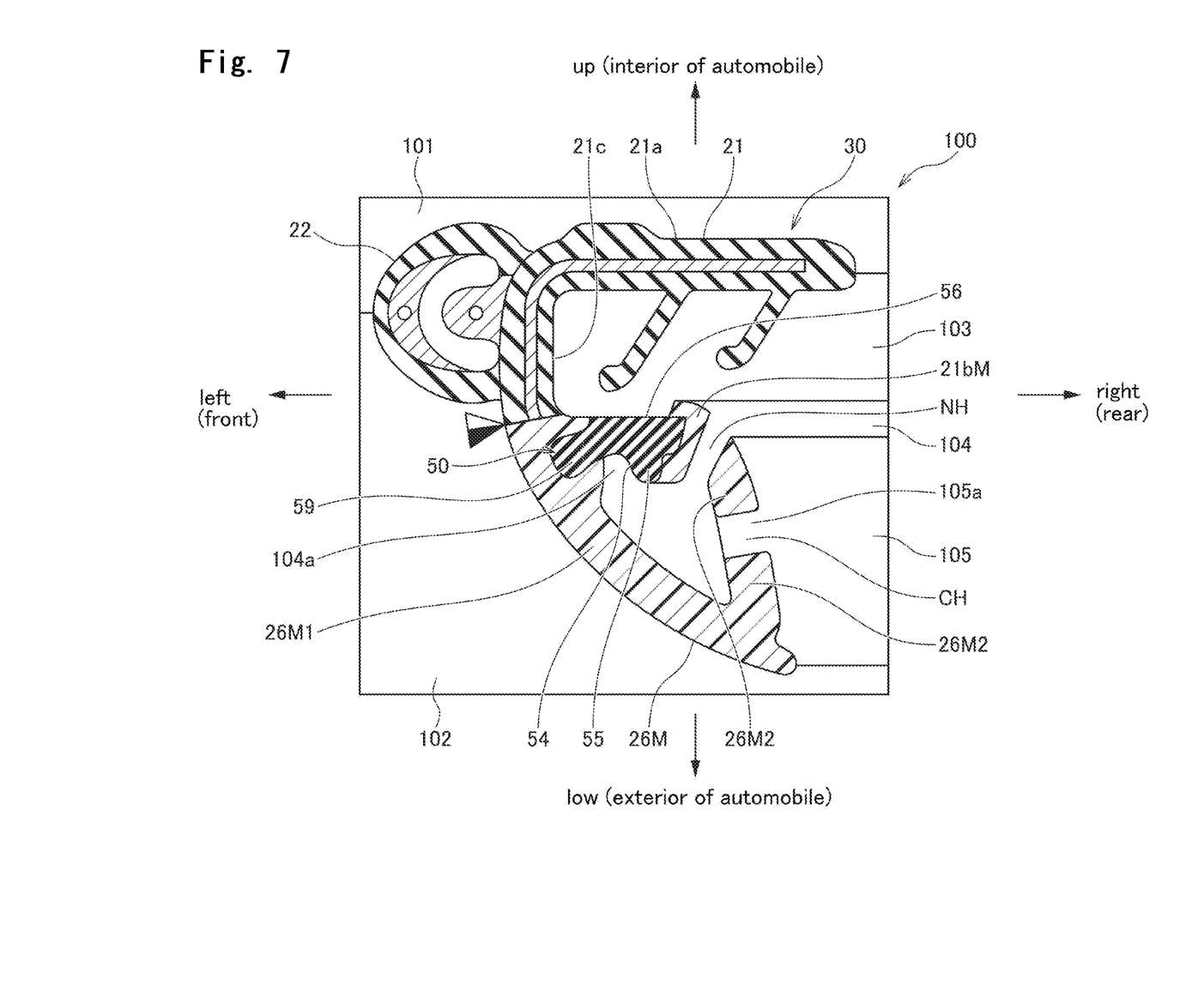
FIG. 7 is an enlarged cross-sectional view of the die taken along line VII-VII in FIG. 2 with the weather strip according to the embodiment of the present invention under the die molding.
Figure 8:
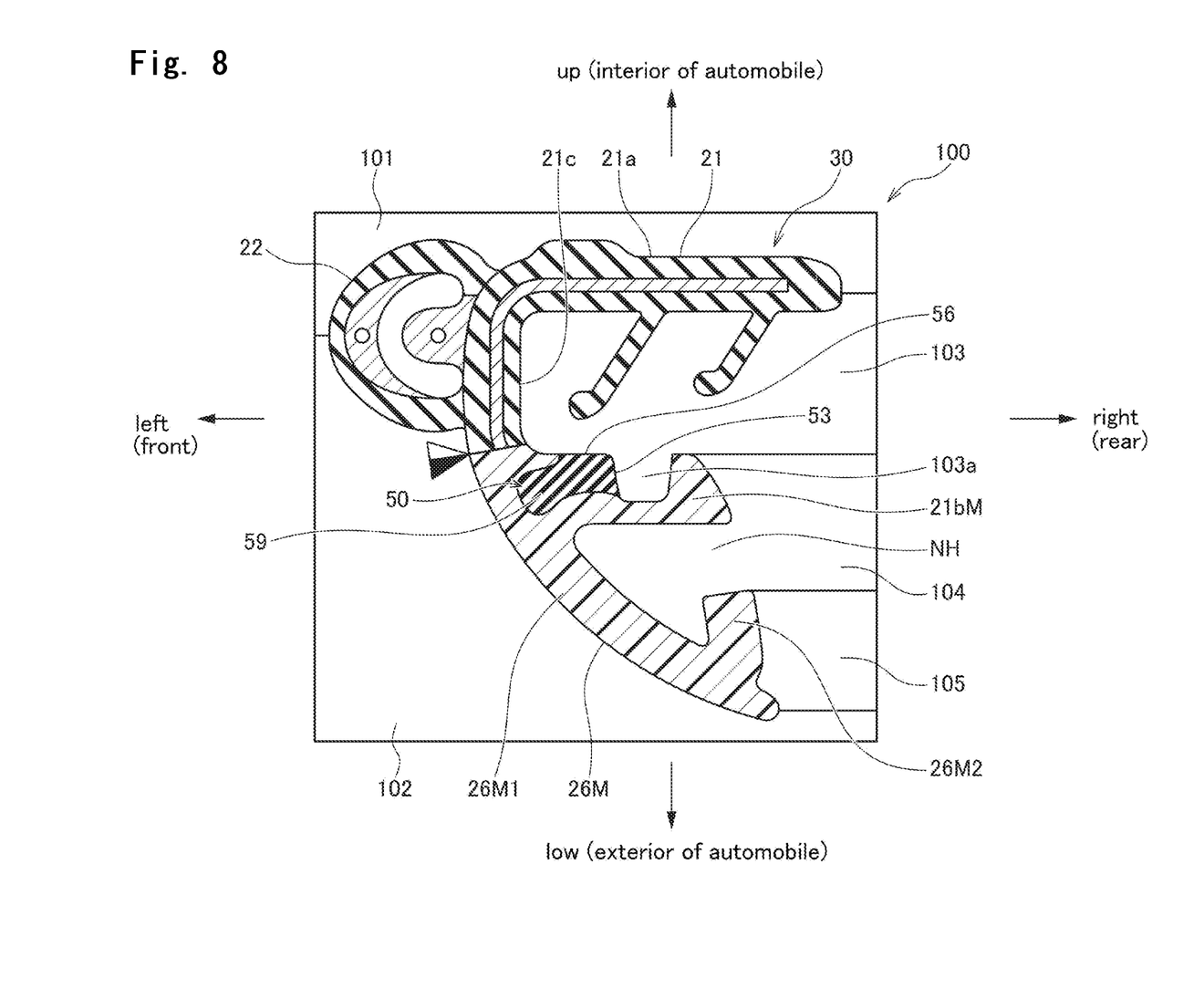
FIG. 8 is an enlarged cross-sectional view of the die taken along line VIII-VIII in FIG. 2 with the weather strip according to the embodiment of the present invention under the die molding.

The plurality of concave shaped parts 53, 54 include first concave shaped parts 53 illustrated in FIGS. 3 and 8 and second concave shaped parts 54 illustrated in FIGS. 3 and 7. The first concave shaped parts 53 are prepared by providing holes that pierce the insert 50 in an inner-cabin and outer-cabin direction. The second concave shaped parts 54 are prepared by providing protrusions 55, to arrange the second concave shaped parts 54 closer to a front part of the automobile body than the protrusions 55. The protrusions 55 extend toward the exterior of the automobile.

Figure 5:
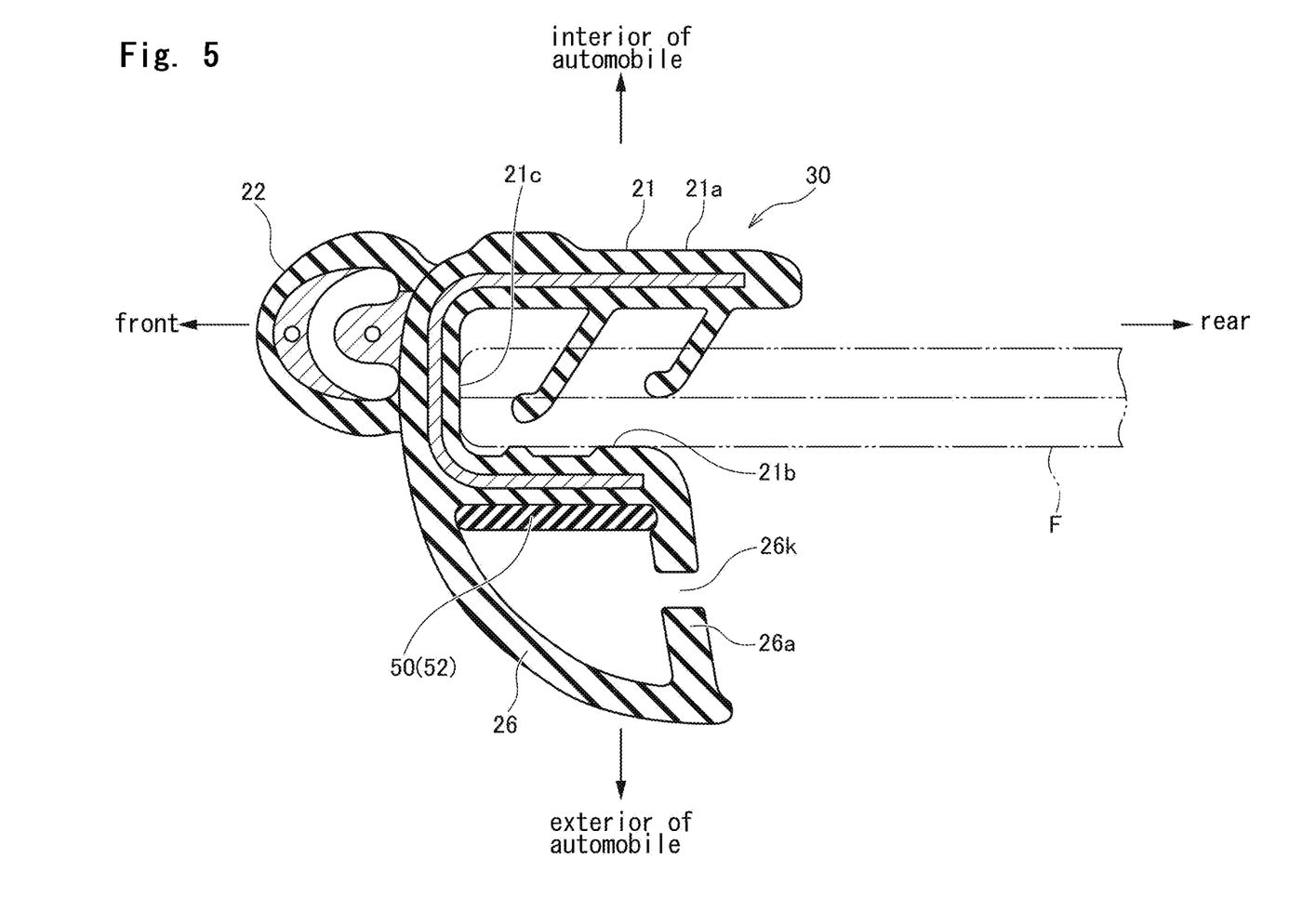
FIG. 5 is an enlarged cross-sectional view taken along line V-V in FIG. 2.
Figure 6:
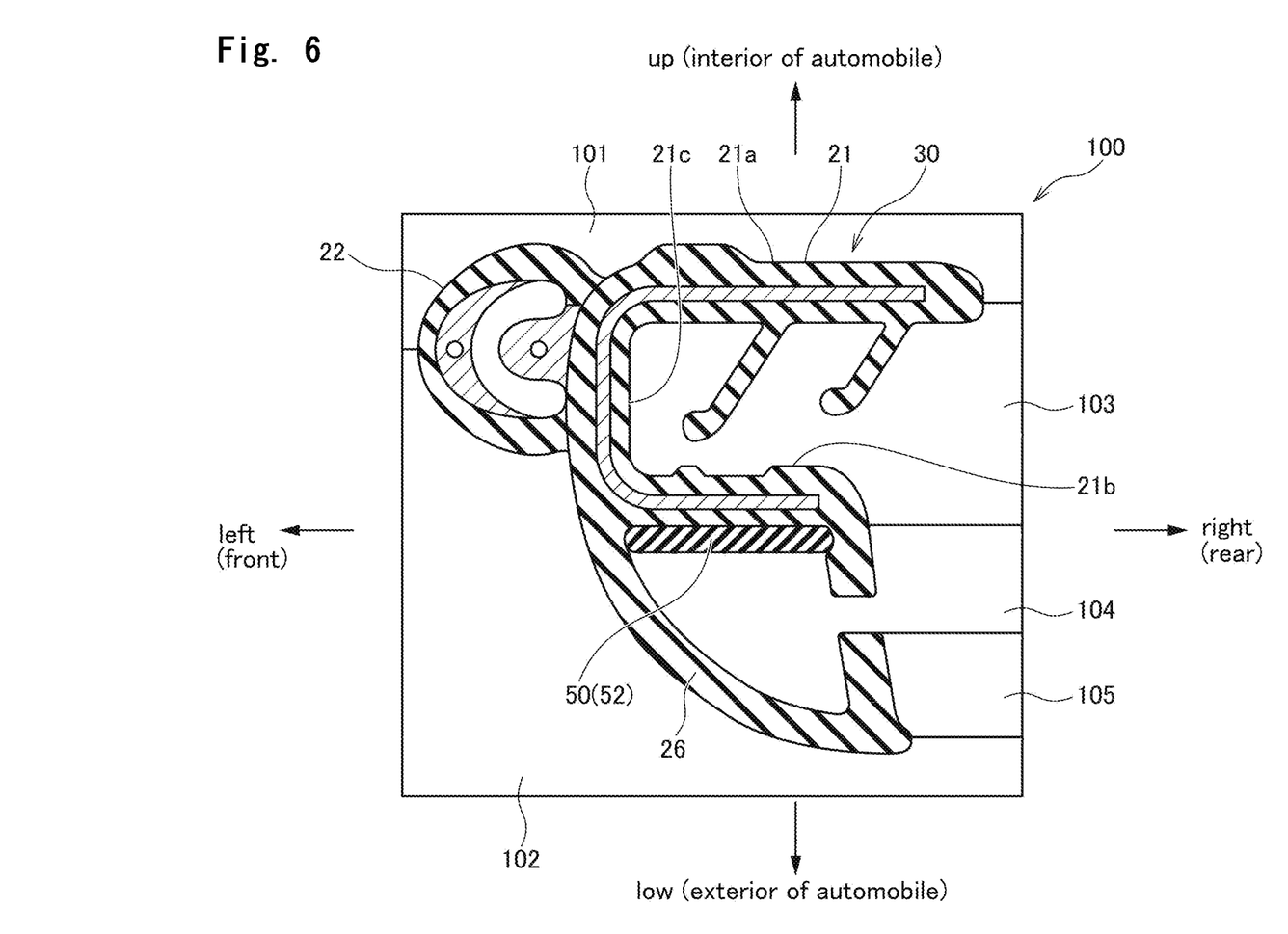
FIG. 6 is an enlarged cross-sectional view of a die taken along line V-V in FIG. 2 with the weather strip according to the embodiment of the present invention under die molding.

As illustrated in FIG. 3, the insert 50 has an upper edge 51 and a lower edge 52. The edges 51, 52 are flat, to provide flat-shaped parts, and have second protrusions 58 closer to interior of automobile. The edges 51, 52 are greater in width in a front-rear direction of the automobile body than thickness in an inner-cabin and outer-cabin direction. As illustrated in FIGS. 2, 5, and 6, the flat-shaped parts are inserted into an outer-cabin side part of the installation base member 21, which is formed by extrusion molding and uncut, from the cut-out portion K, to arrange the flat-shaped parts on an outer-cabin side surface of the first outer-cabin side wall 21b. The upper edge 51 is inserted into an upper part of the outer-cabin side part of the installation base member 21 from the cut-out portion K. The lower edge 52 is inserted into a lower part of the outer-cabin side part of the installation base member 21 from the cut-out portion K. The second protrusions 58 extend toward an interior of the automobile as illustrated in FIG. 3, and abut with an end surface of the installation base member 21 (illustration omitted), which is uncut, to prevent the insert 50 from advancing too deep inside when the insert 50 is being inserted.

The cut-out portion K is subjected to the die molding to be discussed below referring to FIGS. 7 and 8, to provide a second hollow seal part 26M formed by die molding and a second outer-cabin side wall 21bM formed by die molding. The second hollow seal part 26M corresponds to the first hollow seal part 26, formed by extrusion molding, and the second outer-cabin side wall 21bM corresponds to the first outer-cabin side wall 21b, formed by extrusion molding. The second hollow seal part 26M includes an inclined wall 26M1 formed by die molding and a second installation wall 26M2 formed by die molding. The inclined wall 26M1 inclines and extends toward the exterior of the automobile from part of the second outer-cabin side wall 21bM closer to the hollow part 22. The second installation wall 26M2 connects with, or extends from, an end part of the inclined wall 26M1 and extends toward an end part of the second outer-cabin side wall 21bM.

The insert 50 is embedded in the second outer-cabin side wall 21bM of the die-molded part M with parts exposed. More specifically, an inner-cabin flat surface 56 and the first concave shaped parts 53, which are provided on an inner-cabin side surface of the insert 50 and to be discussed below referring to FIGS. 7 and 8, are exposed from the die-molded part M, but are invisible. This is because the flange F, to which the second outer-cabin side wall 21bM couples, conceals the exposed parts.

In addition, the second concave shaped parts 54 and the protrusions 55, which are provided on an outer-cabin side surface of the insert 50 and to be discussed below referring to FIG. 7, are exposed from the die-molded part M, but are invisible. This is because the second hollow seal part 26M, provided closer to the exterior of the automobile, conceals the exposed parts.

The exposed parts on the inner-cabin side surface and the outer-cabin side surface of the insert 50, which are invisible, do not spoil appearance.

As illustrated in FIG. 7, the second installation wall 26M2 has holes CH for clips at regular intervals. The holes CH are provided by setting a third pin 105a of a third inner die 105 against the second inner die 104. As illustrated in FIGS. 7 and 8, the second installation wall 26M2 or the second outer-cabin side wall 21bM has a hole NH used to pull out the second inner die 104. The hole NH runs full length of the die-molded part M.

Figure 9:
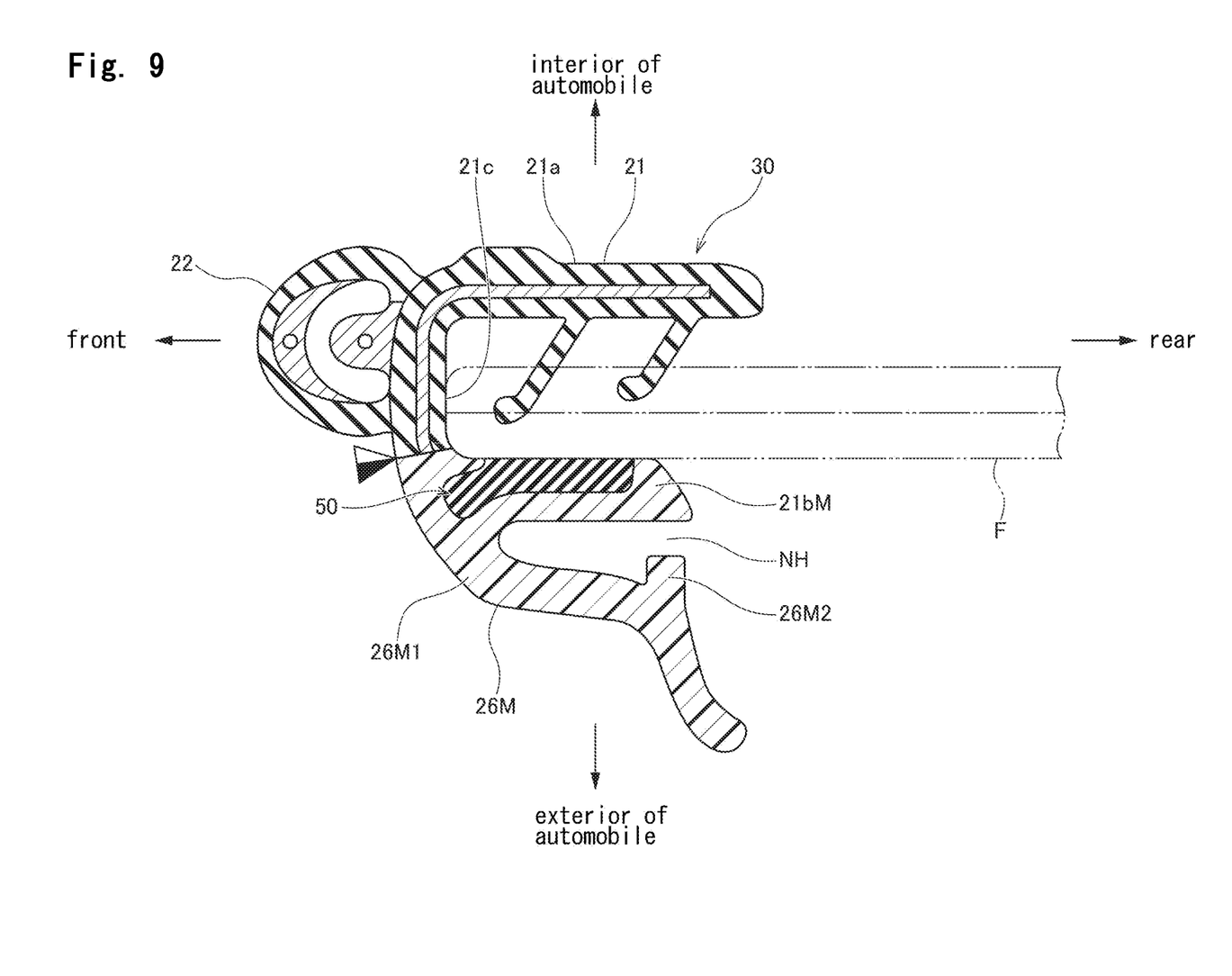
FIG. 9 is an enlarged cross-sectional view taken along line IX-IX in FIG. 2.

In some embodiments, the inclined wall 26M1 is curved as illustrated in FIG. 9 in conformance with the shape of the sliding door 1, which is opposite the inclined wall 26M1.

Figure 1:
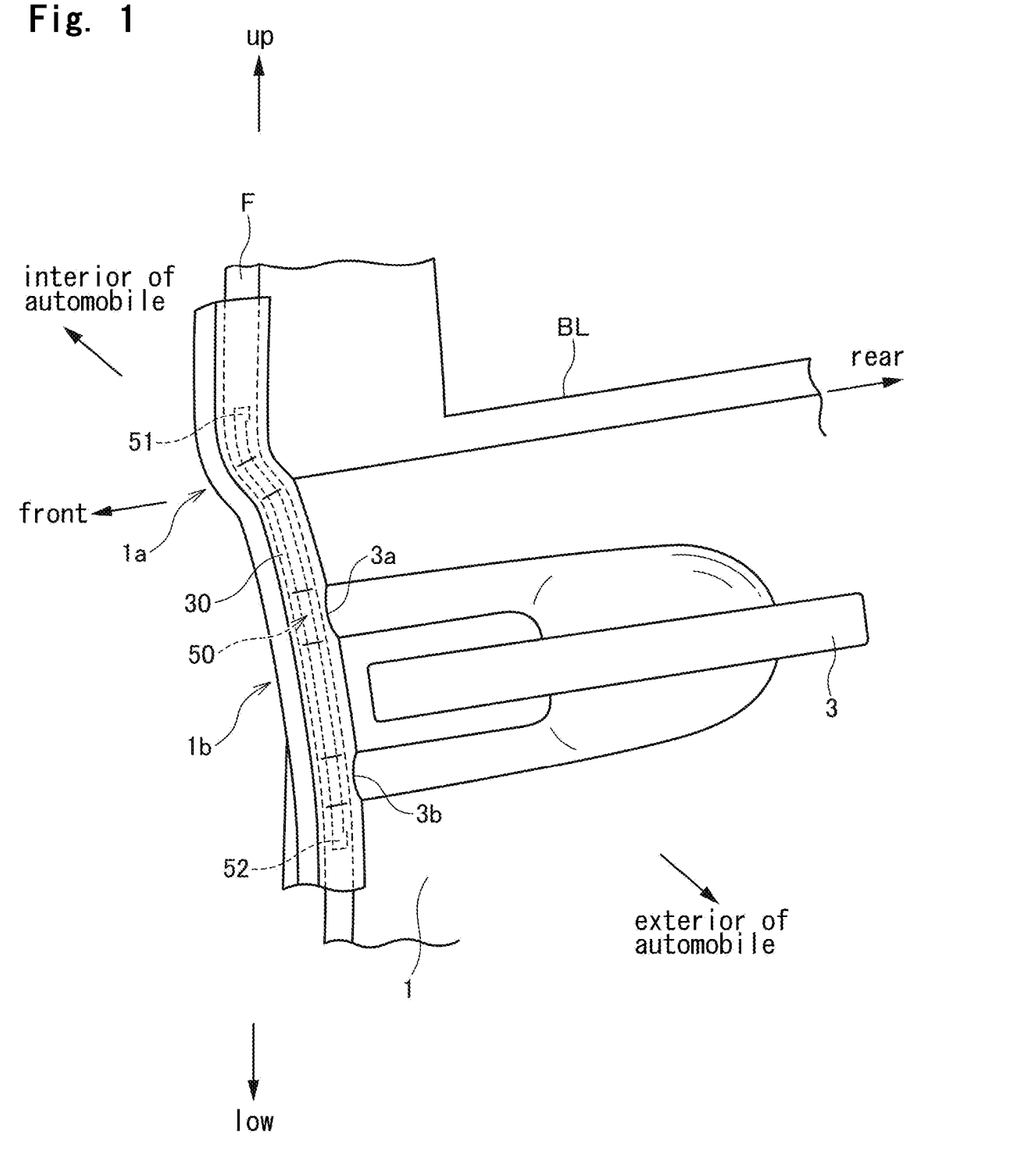
FIG. 1 is an enlarged perspective view of a weather strip according to an embodiment of the present invention coupling to a sliding door illustrated in FIG. 10.

A handle knob 3 illustrated in FIG. 1 has depressions 3a, 3b. In some embodiments, the inclined wall 26M1 is curved as illustrated in FIGS. 1 and 9 in conformance with the depressions 3a, 3b, to prevent spoilage of appearance.

The above-structured weather strip 30 is formed by die molding by the following steps.

First, the first hollow seal part 26 as well as the first outer-cabin side wall 21b is cut out, to provide the cut-out portion K as illustrated in FIG. 2. The first outer-cabin side wall 21b couples to the curved parts 1a, 1b when the weather strip 30, formed by extrusion molding, couples to the flange F as illustrated in FIG. 1. Also, as illustrated in FIG. 5, a cut-out portion 26K is provided in a first installation wall 26a of the first hollow seal part 26, which remains uncut, to pull out an edge of the second inner die 104.

Next, as illustrated in FIGS. 6, 7, and 8, the weather strip 30, which has the cut-out portion K, is positioned between an upper die 101 and a lower die 102 of a die 100. The die 100 includes the first inner die 103, the second inner die 104, and a third inner die 105 between the upper die 101 and the lower die 102. FIGS. 6, 7, and 8 indicate four directions of the weather strip 30 coupling to the flange F in parentheses, that is (interior of automobile), (exterior of automobile), (front), and (rear), as well as four directions of the die 100, that is up, low, left, and right.

As illustrated in FIG. 6, an end of the first inner die 103 is inserted in the installation base member 21 and comes into contact with the inner-cabin side wall 21a, the first outer-cabin side wall 21b, and the connecting wall 21c, to support the installation base member 21 inside the die 100. As illustrated in FIGS. 7 and 8, part of the first inner die 103 other than the end supports the installation base member 21 inside the die 100, and a lower side surface of the first inner die 103 forms part of the cavity used to form the second outer-cabin side wall 21bM.

As illustrated in FIG. 6, an end of the second inner die 104 is inserted in the first hollow seal part 26 and comes into contact with an inner surface of the first hollow seal part 26, to support the first hollow seal part 26 inside the die 100 and press and fix the lower edge 52 on the first outer-cabin side wall 21b.

As illustrated in FIGS. 7 and 8, part of the second inner die 104 other than the end is inserted between the first inner die 103 and the third inner die 105 and forms part of a cavity used to form a die-molded part, that is the second hollow seal part 26M. The second hollow seal part 26M is continuous with the first hollow seal part 26, formed by extrusion molding.

As illustrated in FIG. 8, the first inner die 103 has the first pins 103a at intervals. The first pins 103a protrude downward, that is toward the second inner die 104. As illustrated in FIG. 7, the second inner die 104 has the second pins 104a at intervals. The second pins 104a protrude upward, that is toward the first inner die 103. As illustrated in FIG. 7, the third inner die 105 has the third pins 105a at intervals. The third pins 105a protrude toward the second inner die 104.

Next, the insert 50, shaped in conformance with the curved parts 1a, 1b, is arranged in the cut-out portion K in the cavity alongside of the shape of the curved parts 1a, 1b.

When the insert 50 is arranged alongside of the shape of the curved parts 1a, 1b, as illustrated in FIGS. 5 and 6, the upper edge 51 is inserted into an upper part on an outer-cabin side of the installation base member 21 from the cut-out portion K in the cavity, and is pressed against an outer-cabin side surface of the first outer-cabin side wall 21b by an upper side surface of the second inner die 104. Also, the lower edge 52 is inserted into a lower part on the outer-cabin side of the installation base member 21 from the cut-out portion K in the cavity, and is pressed against the outer-cabin side surface of the first outer-cabin side wall 21b by the upper side surface of the second inner die 104.

The insert 50 is arranged and fixed in the cut-out portion K in the cavity with the first concave shaped parts 53 abutted with the first pins 103a as illustrated in FIG. 8, and with the second concave shaped parts 54 abutted with the second pins 104a as illustrated in FIG. 7.

The abutment in two different directions illustrated in FIGS. 7 and 8 arranges and fixes the insert 50 in a right-left direction of the cavity. Also, the inner-cabin flat surface 56 abuts with a lower side surface of the first inner die 103 as illustrated in FIGS. 7 and 8, and a first protrusion 57 closer to exterior of the automobile, illustrated in FIG. 3, abuts with the upper side surface of the second inner die 104 (illustration omitted). The abutment in two different directions illustrated in FIGS. 7, 8, and 3 arranges and fixes the insert 50 in an upper-lower direction of the cavity.

The insert 50, arranged and fixed in the right-left and upper-lower directions of the cavity, is prevented from misalignment under the pressure from injection of the die-molding material into the cavity. As illustrated in FIGS. 7, 8, the insert 50 also includes a front side protrusion 59, which extends diagonally toward the front part of the automobile body and toward the exterior. The front side protrusion 59, kept away from the first inner die 103 or the second inner die 104, is embedded in the die-molded part M without being exposed, to increase bonding strength of the insert 50 to the die-molded part M.

As illustrated in FIG. 7, the hole NH used to pull out the second inner die 104 from the second hollow seal part 26M runs full length of the die-molded part M. Also, the second installation wall 26M2 has the holes CH for clips (illustration omitted) at intervals to fix the weather strip 30 on the sliding door 1. The second installation wall 26M2 and the holes CH are formed by setting the third pin 105a against the second inner die 104, pouring the die-molding material into the die 100, and releasing the die-molded part M from the die 100.

Pouring the die-molding material into the die 100 and releasing the die-molded part M from the die 100 as discussed above forms the weather strip 30 illustrated in FIG. 2 with the die-molded part M, prepared by subjecting the cut-out portion K to die molding.

As illustrated in FIGS. 7 and 8, the insert 50 of the method of manufacturing the weather strip 30 of this embodiment abuts with the first pins 103a and the second pins 104a under the die molding. This configuration fixes the insert 50. In addition, the upper edge 51 and the lower edge 52 are sandwiched and fixed between the first outer-cabin side wall 21b and the second inner die 104, which is inserted in the first hollow seal part 26. This configuration increases fixing force of the insert 50, to prevent misalignment of the insert 50 due to the pressure from injection of the die-molding material.

This configuration keeps appearance of the weather strip 30 unspoiled and prevents deterioration in sensor function due to the misalignment of the insert 50.

Parts of the insert 50 that abut with the first pins 103a and the second pins 104a are kept away from the die-molding material and exposed from the die-molded part M, but are invisible. This is because the second hollow seal part 26M conceals the exposed parts. This configuration keeps appearance unspoiled.

Material of the insert 50 and material of the die-molding material may have similar flexibility. In some embodiments, the insert 50 is made of PP and the die-molding material is made of TPO.

This allows the insert 50 and the die-molding material, as bonded together, to yield sense of integrity, and the weather strip 30 to be easier to handle. The die-molding material preferably has a hardness that falls within a range of 20 to 90 JISA, which is soft, of Japan Industrial Standards (JIS), and more preferably in a range of 40 to 90 JISA. If the hardness is less than 40 JISA, the die-molded part M can perform an insufficient function (including assemblability to the automobile body). If the hardness is less than 20 JISA, the die-molded part M performs the insufficient function. In some embodiments, the insert 50 is covered with another resin material including adhesive, to prevent infiltration of water into inner electric components or wiring. In this modification, the other resin material, which is as soft as or softer (lower in hardness) than the die-molding material, does not hamper the sense of integrity.

In some embodiments, the material of the insert 50 and the material of the die-molding material have compatibility. This allows the insert 50 and the die-molded part M to yield the sense of integrity, and the weather strip 30 to be easier to handle. If the insert 50 is to be covered by the other resin material including adhesive to prevent infiltration of water, the compatibility simplifies selection of the adhesive to bond with the insert 50 and the die-molding material firmly. In some embodiments, the material of the insert 50 and the material of the die-molding material are so similar in property as to fuse. This allows the insert 50 to adhere to the die-molding material closely under the die molding without using adhesive, and prevents infiltration of water into the inner electric components or wiring. It is to be noted that "compatibility" in a narrow sense indicates that the material of the insert 50 and the material of the die-molding material are so similar in property as to fuse. When one material is TPO, the other material is polypropylene, polyethylene, TPO, or TPE, which includes olefinic resin. Examples of TPE, which includes olefinic resin, include thermoplastic styrenic elastomer (TPS). When one material is TPS under the condition that TPS includes olefinic resin, the other material is compatible with the TPS and so similar in property as to weld or fuse like the aforementioned TPO.

In this embodiment, the insert 50 has three first concave shaped parts 53, which abut with the first pins 103*a*, and eight concave shaped parts 54, which abut with the second pins 104*a*, at intervals in the upper-lower direction, or the direction parallel to the peripheral edge of the opening, of the insert 50. Number or method of fixing the concave shaped parts 53, 54 is not limited. In this embodiment, it is only required that the concave shaped parts of the insert 50 abut with and the first pins 103*a* and the second pins 104*a* and are fixed, to prevent misalignment of the insert 50 under the die molding.

In this embodiment the weather strip 30 couples to the curved parts 1*a*, 1*b* of the flange F of the sliding door 1, which moves between at least two positions. In some embodiments, the weather strip 30 couples to curved parts of the flange F of the opening.

In some embodiments, the weather strip 30 couples to curved parts of the flange F of a back door or a sunroof.

In this embodiment, the sensor S is unified with the hollow part and detects the electric signal which provides the indication that the object is in the opening. In some embodiments, the sensor S is separable, not unified, and fixed in the hollow part separately.

We claim:

1. A weather strip operably couplable to a flange of at least one of a peripheral edge of a panel of an automobile or a peripheral edge of a door opening of an automobile body of the automobile, the flange having curved parts, the panel being movable between at least two positions to open and close the opening, and the weather strip comprising:
   an installation base member operably couplable to the flange, the installation base member including an inner-cabin side wall, a first outer-cabin side wall, and a connecting wall which connects the side walls;
   a die-molded part, the die-molded part having been formed by subjecting a cut-out portion of the installation base member to a die molding process using die-molding material, and the cut-out portion being a portion of the installation base member at which a material of the installation base member has been cut out;
   a hollow part integrally formed with the installation base member by extrusion molding; and
   an insert shaped in conformance with the curved parts, the insert having a plurality of concave shaped parts, the insert being embedded within the die-molded part, and the plurality of concave shaped parts being configured to abut with a plurality of pins of a die under the die molding process,
   wherein a material of the insert and a material of the die-molding material have compatibility.

2. The weather strip as claimed in claim 1, wherein the plurality of concave shaped parts are exposed from the die-molding material.

3. The weather strip as claimed in claim 1, wherein:
   the insert has flat edges which define flat-shaped parts thereof, and
   the flat-shaped parts are provided in an uncut part of the installation base member adjacent the cut-out portion, and are arranged on an outer-cabin side surface of the first outer-cabin side wall.

4. The weather strip as claimed in claim 1, further comprising a first hollow seal part on an outer-cabin side of the installation base member, the first hollow seal part being formed by extrusion molding,
   wherein:
   the cut-out portion is formed by cutting out portions of the first hollow seal part and the first outer-cabin side wall of the installation base member,
   the die-molded part includes a second hollow seal part formed by the die molding process and a second outer-cabin side wall formed by the die molding process, with the insert being arranged and embedded in the second outer-cabin side wall, and
   the second hollow seal part of the die-molded part is continuous with the first hollow seal part of the installation base member, and the second outer-cabin side wall of the die-molded part is continuous with the first outer-cabin side wall of the installation base member.

5. The weather strip as claimed in claim 4, wherein:
   the second hollow seal part includes an inclined wall formed by the die molding process and a second installation wall formed by the die molding process,
   the inclined wall inclines and extends toward an exterior of the automobile from a part of the second outer-cabin side wall closer to the hollow part,
   the second installation wall connects with an end part of the inclined wall and extends toward an end part of the second outer-cabin side wall formed by die molding, and
   the inclined wall is curved in conformance with a member which is opposite the inclined wall.

6. The weather strip as claimed in claim 4, wherein:
   the second hollow seal part includes an inclined wall formed by the die molding process and a second installation wall formed by the die molding process,
   the inclined wall inclines and extends toward an exterior of the automobile from a part of the second outer-cabin side wall closer to the hollow part,
   the second installation wall connects with an end part of the inclined wall and extends toward an end part of the second outer-cabin side wall, and
   a hole configured to receive a clip is formed in the second installation wall.

7. The weather strip as claimed in claim 5, wherein a hole configured to receive a clip is formed in the second installation wall.

8. The weather strip as claimed in claim 1, further comprising:

a sensor fixed in the hollow part, wherein, when an object is disposed between the panel and the opening and makes contact with the hollow part when the panel is moved towards a closed position, an electric signal providing an indication that the object is in the opening is output.

9. The weather strip as claimed in claim 1, wherein the material of the insert and the material of the die-molding material are similar enough in property so as to fuse.

10. The weather strip as claimed in claim 1, wherein the material of the insert and the material of the die-molding material are fused.

11. A method of manufacturing the weather strip as claimed in claim 1, the method comprising:

placing the weather strip, after the cut-out portion has been formed, between an upper die and a lower die of the die;

providing inner dies between the upper die and the lower die, the inner dies having the plurality of pins which protrude;

arranging and fixing the insert in the cut-out portion such that the plurality of concave shaped parts abut with the plurality of pins of the inner dies, the cut-out portion being a portion of the installation base member into which the insert is embedded by the die molding process;

pouring the die-molding material into the cut-out portion in a state in which the insert is arranged and fixed in the cut-out portion; and subjecting the cut-out portion with the insert arranged and fixed therein to die molding.

* * * * *